United States Patent

[11] 3,527,210

[72] Inventor Edward J. Towns
 Livingston, New Jersey
[21] Appl. No. 452,072
[22] Filed April 30, 1965
[45] Patented Sept. 8, 1970
[73] Assignee By mesne assignments, to
 Ortho Pharmaceutical Corporation,
 a corporation of New Jersey

[54] MOLDED SPRING RETURN MEANS FOR PLASTIC ARTICLES
 5 Claims, 14 Drawing Figs.
[52] U.S. Cl. .................................................. 128/130,
 128/471, 128/472, 2/260
[51] Int. Cl. ............................................... A61f 5/46
[50] Field of Search ..................................... 128/130,
 233, 132, 127, 465, 433; 24/61; 2/260, 261, 262,
 264, 255

[56] References Cited
 UNITED STATES PATENTS
 536,540 3/1895 Paine............................. 128/130
 664,495 12/1900 Paine............................. 128/30
 2,908,913 10/1959 Sobel............................. 2/260

3,200,815 8/1965 Margulies..................... 128/30
3,253,590 5/1966 Birnberg et al. .............. 128/30

Primary Examiner—Adele M. Eager
Attorney—Kenyon and Kenyon, Reilly, Carr and Chapin CLAIM: 1. A ring-shaped molded plastic intrauterine device having an inside diameter substantially greater than its maximum cross-sectional dimension taken along a radius and adapted to be bent at at least one particular location, said device having molded therein at least one hinge comprising a web disposed on the inside perimeter of said device and at the location at which said device is intended to be bent, said web having a thickness in the plane essentially perpendicular to the plane of bending which is substantially less than the thickness of the adjacent portions of said device in the plane essentially perpendicular to the plane of bending and said web being of such thickness and such depth to initially resist deformation of said device in response to an externally applied force and to urge said device back to its original ring-shaped configuration after having been bent and upon release of externally applied force, whereby when said device is bent in the intended direction, said web bends in a plane essentially perpendicular thereto.

Patented Sept. 8, 1970 3,527,210
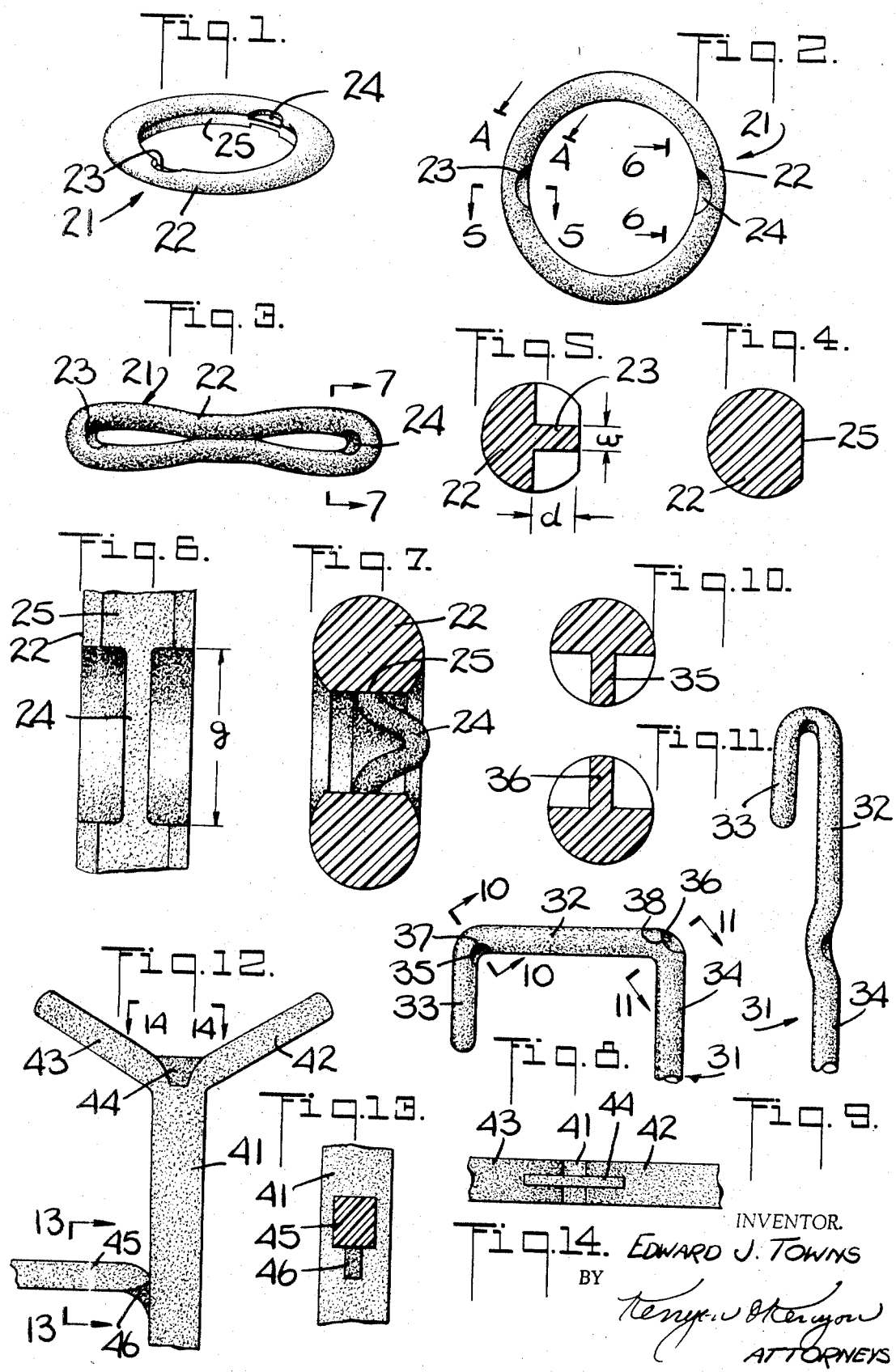
INVENTOR.
EDWARD J. TOWNS
BY
Kenyon & Kenyon
ATTORNEYS

MOLDED SPRING RETURN MEANS FOR PLASTIC ARTICLES

This invention relates to plastic articles having molded spring return means, and more particularly relates to intrauterine contraceptive devices made of molded plastic embodying spring return means.

The use of molded plastic articles is now notoriously common. In general, the plastic portion of an article is shaped during manufacture and then is intended to keep its shape during use. However, there are instances where plastic articles or devices, although intended to maintain their original shape even under the stress of a lightly applied external force, are also intended to be bent or deformed during use and then to regain substantially their original configuration upon the release of the force used to bend them and without having suffered any permanent set or deformation. An illustration of articles of this character are the molded plastic intrauterine contraceptives now receiving widespread publicity. Some such contraceptives are described at pages 79—82 of the April 1965 issue of the Reader's Digest, which is an abstract of an article appearing in the February 1965 issue of McCall's magazine. Both such publications are hereby incorporated by reference.

Designing plastic articles for service of the character referred to above, and specifically molded plastic intrauterine devices, poses a number of problems. The plastic used must be flexible but have a relatively high degree of stiffness. The cross section thickness must be sufficiently great to provide sufficient sturdiness in use. However, the stiffness of the plastic and its thickness must not be so great as to prevent the article from being bent through a substantial angle in use. Furthermore, it is desirable that the plastic have a relatively high elastic limit and a relatively high resistance to "cold flow", characteristics which permit the plastic to be severely deformed and then to return to its original configuration upon release of the deforming force. These somewhat inconsistent requirements and characteristics make it difficult to design molded plastic articles for such service, and my invention is addressed to improving the design of plastic articles, particularly of molded plastic intrauterine contraceptive devices.

An object of my invention is to provide a spring return means for plastic articles.

Another object of my invention is to provide a structural design for molded plastic articles intended to be sharply bent during use which will resist bending under light stress, and which will facilitate restoration of the article to its original configuration after having been bent and upon release of the bending force or constraint.

An additional object is to provide a structural design for molded plastic intrauterine contraceptive devices which must be bent flat during insertion into a uterus and then must regain substantially their original configuration for effective functioning.

I have now discovered an improved structural design for articles having plastic portions intended to be bent through substantial angles and then to return to their original shape after release of the external bending force. Briefly summarized, one embodiment of my invention comprises an article, or a component thereof, made of plastic characterized by relative stiffness and adapted to be bent through a substantial angle, wherein the plastic has a relatively large ratio of effective length to its cross-sectional dimension in the plane formed when the plastic is bent, and which plastic has molded therein a spring return means comprising a web disposed on the side of the plastic towards which, and at the location where, the plastic is to be bent.

In another embodiment, my invention comprises a molded toroidal (or ring-shaped) plastic intrauterine device having an inside diameter substantially greater than its maximum solid cross-sectional dimension taken along a radius and adapted to be bent at at least one particular point, which device has molded therein a hinge comprising a web disposed on the inside perimeter of the device and at each point where the device is intended to be bent, such web being of such thickness and of such depth to initially resist deformation of its circular configuration in response to an externally applied force and to urge the device back to its original ring-shaped configuration after having been bent and upon release of the externally applied force.

In another embodiment, my invention comprises an elongated molded plastic intrauterine device adapted to be bent through a substantial angle without exceeding its elastic limit and having an effective length substantially greater than its cross-sectional dimension at the location and in the plane of bending, which device has molded therein at least one web disposed at the location where the device is to be bent, such web being of such thickness and of such depth to initially resist deformation in response to an externally applied force and to urge the device back to its original configuration after having been bent and upon release of externally applied force or constraint.

Other objects and features of the invention will become apparent in the following description and claims, and in the drawings, in which:

FIG. 1 is an isometric view of a toroidal intrauterine device provided with two spring return means;

FIG. 2 is a plan view of the intrauterine device of FIG. 1;

FIG. 3 is a plan view of the intrauterine device of FIGS. 1 and 2 after having been bent substantially flat;

FIG. 4 is a cross-sectional view along line 4—4 of FIG. 2;

FIG. 5 is a cross-sectional view taken along the line 5—5 of FIG. 2 and sectionally through a web;

FIG. 6 is a side view along line 6—6 of FIG. 2;

FIG. 7 is a sectional view taken along line 7—7 of FIG. 3;

FIG. 8 is a plan view of an elongated plastic member having two 90° bends and provided with different embodiments of spring return means at each bend;

FIG. 9 is a plan view of the elongated member of FIG. 8 after having been bent;

FIG. 10 is a sectional view along line 10—10 of FIG. 8;

FIG. 11 is a sectional view along line 11—11 of FIG. 8;

FIG. 12 is an elevational view of a plastic piece provided with two outwardly and upwardly extending arms having a spring return means between them and an outwardly extending single arm having a spring return means disposed on the underside thereof;

FIG. 13 is a sectional view taken along line 13—13 of FIG. 12; and

FIG. 14 is a top view taken along line 14—14 of FIG. 12.

Referring now to FIGS. 1 through 7, toroidal intrauterine device 21 comprises a torus 22 provided with webs 23 and 24 disposed along the inside perimeter of the torus and at opposite ends of a diameter. As shown in FIG. 4, the torus is substantially cylindrical but its internal perimeter has a flat surface 25, which is optional. Webs 23 and 24 are designed alike and have a cross section as shown in FIG. 5. The width of the web is denoted by $w$ and the depth of the web denoted by $d$ in FIG. 5. The length of the web shown in FIG. 6 is denoted by $q$.

Referring now to FIGS. 8 through 11, FIG. 8 illustrates an elongated piece of plastic 31 of circular cross section comprising a base section 32 and two sections 33, 34 disposed, in normal shape and free from externally applied force, parallel to each other and perpendicularly to base section 32. Web 35 is disposed along the inside of the angle formed between sections 32 and 33 in order to permit section 33 to be bent flat along base section 32, whereas web 36 is disposed opposite the acute angle formed between sections 32 and 34 in order to permit section 34 to be bent into substantial alignment with base section 32. FIG. 9 illustrates such elongated piece after having been bent as described in the foregoing sentence and while still under the constraint of an externally applied force (not shown). The curvature 37 of the undercut portion of web 35 when at rest has a shorter radius than the comparable curvature 38 of web 36.

Whereas FIGS. 1 through 11 illustrate spring return means disposed in plastic pieces having a curved configuration, FIGS. 12 through 14 illustrate two different embodiments of the spring return means. Rectangular post 41 is provided with two outwardly and upwardly extending arms 42 and 43 having a rectangular cross section. A web 44 is integrally molded between arms 42 and 43 and extends upwardly from post 41. In this embodiment, arms 42 and 43 are adapted to be bent upwardly to a point where their respective longitudinal axes are approximately parallel to the longitudinal axis of post 41.

Post 41 is further provided with an outwardly projecting arm 45 adapted to be bent downward. Web 46 is molded integrally with post 41 and the underside of arm 45.

The spring return means described herein may be molded into any suitable flexible plastic characterized by relative stiffness and having a relatively high elastic limit and relatively high resistance to cold flow. Illustrative suitable plastics including low density polyethylene, polyvinyl chloride and particularly copolymers of ethylene and vinyl acetate. Articles made of such plastics and embodying spring return means are advantageously made by injection molding.

The number of overall configurations of the articles to which this invention is applicable is exceedingly large and only illustrative examples have been depicted in the figures. The cross-sectional configurations of such articles at points adjacent to the spring return means may be circular, elliptical, rectangular or otherwise as is necessary or preferred for the purpose to which the plastic article is to be used. It is characteristic, however, that the invention will be used in articles in which the plastic portions adjacent to the spring return means have a relatively high ratio of effective length to the cross-sectional dimension of the plastic at the point where the web is molded into it and in the plane formed by the web, which is to say, the plane formed by the angle through which the plastic is intended to be bent. The term "effective length" is intended to include the inside diameter of toroidally-shaped articles, such as shown in FIGS. 1 through 3. The term "substantial angle" signifies the maximum angle of bending reasonably permissible, taking into account the configuration of the article.

It is also to be understood that the design of the web and specifically its width, depth, and length, depend upon a number of correlative factors including, for instance, the characteristics of the plastic, the normal (or "at rest") shape (both generally and specifically at the point of intended bending) of the plastic article when no external forces are applied to it, the angle through which the article will be bent in use, the desired extent of resistance to initial deformation and the desired extent of restoration to original configuration upon the release of externally applied force. However, generally such a web has a width in the range of from about 15 percent to about 50 percent of the maximum cross-sectional dimension of the plastic article taken in a plane (as shown in FIGS. 5, 10 and 11) perpendicular to the intended plane of bending, and a depth of less than about 60 percent of the maximum cross-sectional dimension of the plastic article taken in the plane of bending. Although the cross section of the web itself will normally be rectangular, as shown in the drawings, it may be in the form of a trapezoid. The length of the web is more dependent upon the shape of the article at the intended point of bending and hence is less susceptible of quantitative generalization. However, in respect to webs molded into curved plastic articles of substantially circular and uniform cross section and as shown in FIG. 8, the web length will generally be greater for webs molded into the outside of a curve, such as web 36, than for webs molded into the inside of a curve, such as web 35.

I claim:

1. A ring-shaped molded plastic intrauterine device having an inside diameter substantially greater than its maximum cross-sectional dimension taken along a radius and adapted to be bent at at least one particular location, said device having molded therein at least one hinge comprising a web disposed on the inside perimeter of said device and at the location at which said device is intended to be bent, said web having a thickness in the plane essentially perpendicular to the plane of bending which is substantially less than the thickness of the adjacent portions of said device in the plane essentially perpendicular to the plane of bending and said web being of such thickness and such depth to initially resist deformation of said device in response to an externally applied force and to urge said device back to its original ring-shaped configuration after having been bent and upon release of externally applied force, whereby when said device is bent in the intended direction, said web bends in a plane essentially perpendicular thereto.

2. A substantially toroidal molded plastic intrauterine device adapted to be bent through a substantial angle at at least one point without exceeding its elastic limit and having an inside diameter substantially greater than the maximum cross-sectional dimension of the torus at the point of bending, said device having molded therein a web disposed on the inside perimeter of the torus and at the point at which said device is intended to be bent, said web having a thickness in the plane essentially perpendicular to the plane of bending which is substantially less than the thickness of the adjacent portions of said device in the plane essentially perpendicular to the plane of bending and said web being of such a thickness and such depth to initially resist deformation of said plastic in response to an externally applied force and to urge said plastic back to its original configuration after having been bent and upon release of any externally applied force, whereby when said device is bent in the intended direction, said web bends in a plane essentially perpendicular thereto.

3. The device of claim 2 having a substantially circular solid cross-section and provided with a concave surface along its inside perimeter and with two of said webs disposed at opposite ends of a diameter.

4. A molded plastic intrauterine device adapted to be bent through a substantial angle without exceeding its elastic limit and having an effective length substantially greater than its cross-sectional dimension at the point and in the plane of bending, said device having molded therein a web disposed on a side of said article toward which and at the location at which said article is intended to be bent, said web having a thickness in the plane essentially perpendicular to the plane of bending which is substantially less than the thickness of the adjacent portions of the article in the plane essentially perpendicular to the plane of bending and said web being of such thickness and such depth to initially resist deformation of said plastic in response to an externally applied force and to urge said plastic back to its original configuration after having been bent and upon release of externally applied force, whereby when the article is bent in the intended direction, said web bends in a plane essentially perpendicular thereto.

5. The article of claim 4 which in its normal configuration forms approximately a 90° angle at the point where said web is disposed.